(12) United States Patent
Yamada

(10) Patent No.: US 11,048,153 B2
(45) Date of Patent: Jun. 29, 2021

(54) OPTICAL DEVICE AND DISPLAY DEVICE

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/654,081

(22) Filed: Oct. 16, 2019

(65) Prior Publication Data

US 2020/0124950 A1 Apr. 23, 2020

(30) Foreign Application Priority Data

Oct. 17, 2018 (JP) .............................. JP2018-195719

(51) Int. Cl.
*G03B 21/14* (2006.01)

(52) U.S. Cl.
CPC ................... *G03B 21/147* (2013.01)

(58) Field of Classification Search
CPC .... G03B 21/14; G03B 21/142; G03B 21/147; G03B 21/208; G03B 21/2013; G03B 21/2033; G02B 5/18; G02B 5/1809; G02B 5/1814; G02B 5/1828; G02B 5/1842; G02B 5/1847; G02B 5/1866; G02B 27/0025; G02B 27/0037; G02B 27/48; G02B 27/0101; G02B 27/425; G02B 27/0944; G02B 27/4205; G02B 27/4261

See application file for complete search history.

(56) References Cited

U.S. PATENT DOCUMENTS

| | | | |
|---|---|---|---|
| 10,001,655 B2 * | 6/2018 | Wakabayashi | G02B 6/0026 |
| 2012/0235196 A1 * | 9/2012 | Mochizuki | H01L 33/0045 |
| | | | 257/98 |
| 2019/0034035 A1 * | 1/2019 | Han | G03B 21/001 |
| 2019/0137665 A1 * | 5/2019 | You | G02B 5/1809 |
| 2019/0154877 A1 * | 5/2019 | Capasso | G02B 1/00 |

FOREIGN PATENT DOCUMENTS

| | | |
|---|---|---|
| JP | 2001-066499 A | 3/2001 |
| JP | 2007-057622 A | 3/2007 |
| JP | 2007-058100 A | 3/2007 |
| JP | 2017-198845 A | 11/2017 |

* cited by examiner

*Primary Examiner* — Sultan Chowdhury
(74) *Attorney, Agent, or Firm* — Oliff PLC

(57) ABSTRACT

An optical device of the present disclosure includes an optical element and an aberration correction element configured to correct aberration caused by the optical element. The aberration correction element includes a plurality of columnar structures made of a dielectric material. The plurality of columnar structures have a refractive index and a pitch such that a waveguide effect with respect to incident light is produced, and a diameter of a first columnar structure and a diameter of a second columnar structure among the plurality of columnar structures differ from each other.

18 Claims, 11 Drawing Sheets

OPTICAL DEVICE AND DISPLAY DEVICE

The present application is based on, and claims priority from JP Application Serial Number 2018-195719, filed Oct. 17, 2018, the disclosure of which is hereby incorporated by reference herein in its entirety.

BACKGROUND

1. Technical Field

The present disclosure relates to an optical device and a display device.

2. Related Art

In a display device such as a projector, for example, a means for correcting various aberrations produced by an optical element such as a lens is used to improve display quality. In JP-A-2001-66499, there is disclosed a display device including an optical system configured to magnify and project an image formed on a reduction-side image surface, and be substantially telecentric to the reduction-side image surface, and further including a diffractive optical element on an optical path between a diaphragm and the reduction-side image surface.

The aberration correction optical system described in JP-A-2001-66499 is configured by a combination of a lens and the diffractive optical element. However, when an attempt is made to perform high-precision aberration correction and obtain a display image having a high resolution, problems arise such as an increase in the number of lenses or, as a result of combining the lens and the diffractive optical element, an increase in the size of the lens. As a result, the size of the entire optical system increases, causing an increase in the size of the display device.

In order to solve the above-described problem, an optical device according to an aspect of the present disclosure includes an optical element and an aberration correction element configured to correct aberration caused by the optical element. The aberration correction element includes a plurality of columnar structures made of a dielectric material. The plurality of columnar structures have a refractive index and a pitch such that a waveguide effect with respect to incident light is produced, and a diameter of a first columnar structure and a diameter of a second columnar structure among the plurality of columnar structures differ from each other.

SUMMARY

In the optical device according to an aspect of the present disclosure, the pitch may be not shorter than a wavelength of the incident light within each of the plurality of columnar structures and shorter than a wavelength in air, and the plurality of columnar structures may be configured to have an effect of producing waveguide mode resonance with respect to the incident light.

In the optical device according to an aspect of the present disclosure, the pitch satisfies a phase matching condition of $k = m \cdot 2\pi/U$, where k is a wavenumber, U is a pitch, and m is an integer.

In the optical device according to an aspect of the present disclosure, the aberration correction element may include a base material and the plurality of columnar structures provided on the base material.

In the optical device according to an aspect of the present disclosure, the base material may include a light-transmitting substrate including a first surface and a second surface, and light emitted from the optical element may be incident on the first surface of the light-transmitting substrate and emitted from the second surface of the light-transmitting substrate.

In the optical device according to an aspect of the present disclosure, the base material may include a foundation layer including a first surface and a second surface, and a reflection layer provided to the second surface of the foundation layer. The light emitted from the optical element may be incident on the first surface of the foundation layer, reflected by the reflection layer, and emitted from the first surface of the foundation layer.

In the optical device according to an aspect of the present disclosure, a difference between a refractive index of each of the plurality of columnar structures and a refractive index of the foundation layer may be not lower than 0.1.

In the optical device according to an aspect of the present disclosure, the plurality of columnar structures may be provided on the optical element.

In the optical device according to an aspect of the present disclosure, the aberration correction element may further include a low refractive index layer that is provided around each of the plurality of columnar structures and that has a refractive index lower than the refractive index of each of the plurality of columnar structures.

In the optical device according to an aspect of the present disclosure, a difference between the refractive index of each of the plurality of columnar structures and the refractive index of the low refractive index layer may be not lower than 0.1.

In the optical device according to an aspect of the present disclosure, the aberration correction element may include a first region provided with at least one of the plurality of columnar structures in an irradiation region of the incident light, and a second region not provided with the plurality of columnar structures in an irradiation region of the incident light.

In the optical device according to an aspect of the present disclosure, the aberration correction element may include a third region provided with the plurality of columnar structures, at a first density, in an irradiation region of the incident light, and a fourth region provided with the plurality of columnar structures, at a second density different from the first density, in an irradiation region of the incident light.

In the optical device according to an aspect of the present disclosure, each of the plurality of columnar structures may have a tapered shape with a surface area of a bottom surface greater than a surface area of a top surface.

A display device according to an aspect of the present disclosure includes the optical device according to an aspect of the present disclosure.

DESCRIPTION OF EXEMPLARY EMBODIMENTS

First Exemplary Embodiment

A first exemplary embodiment of the present disclosure will be described below with reference to FIG. 1 to FIG. 9. In the present exemplary embodiment, a projector is described as an example of a display device.

Figure 1:
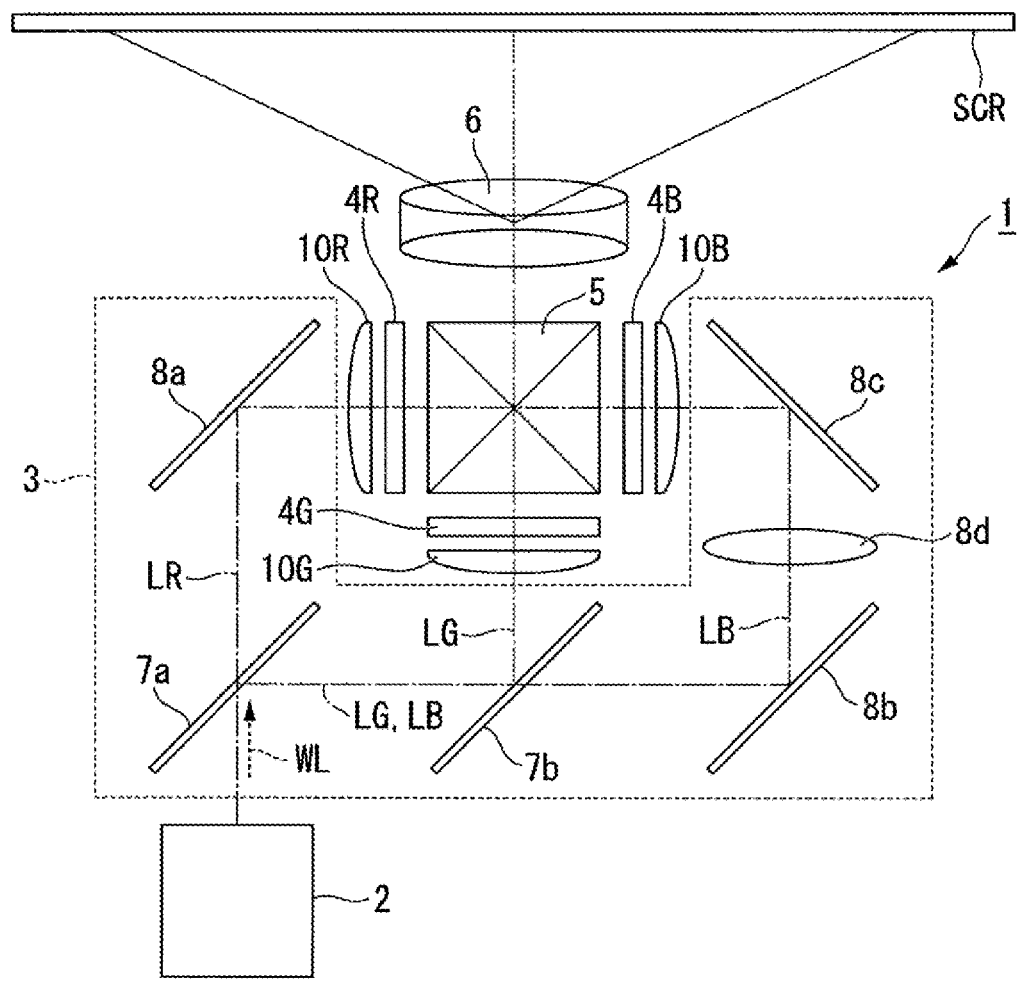
FIG. 1 is schematic configuration diagram of a projector according to a first exemplary embodiment.

FIG. 1 is schematic configuration diagram illustrating a projector according to the first exemplary embodiment.

Figure 2:
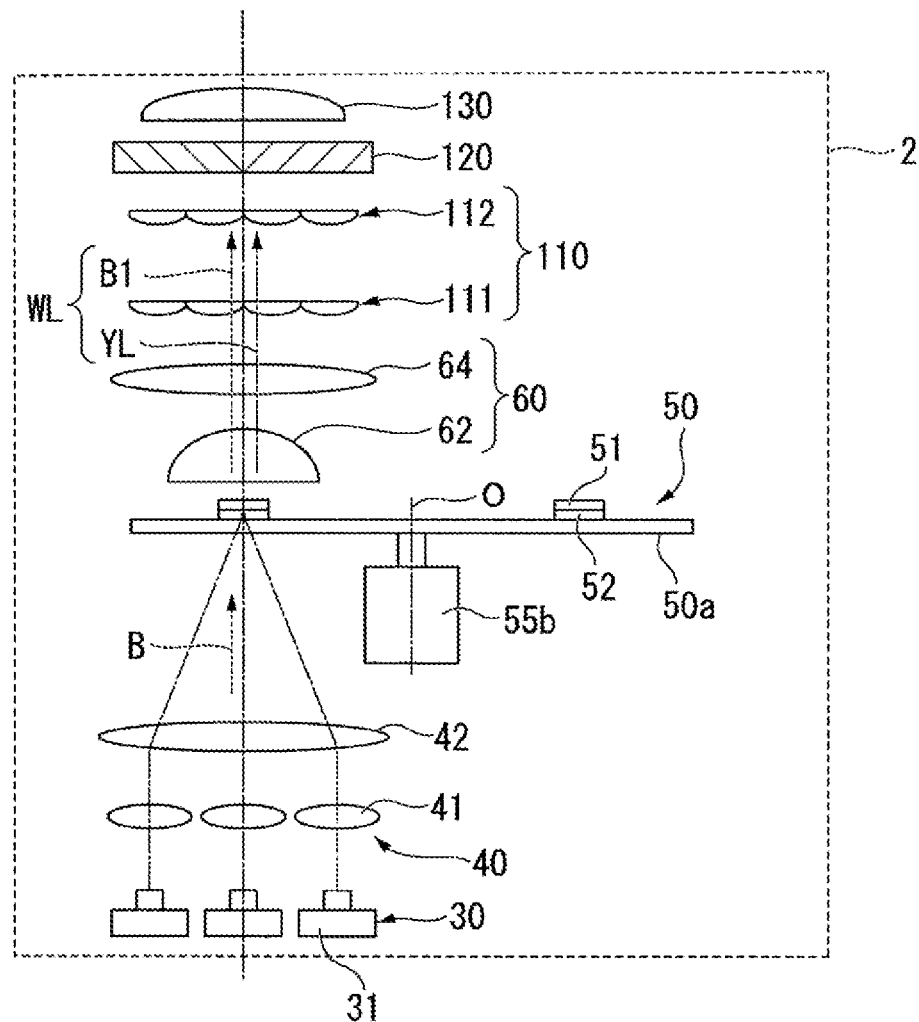
FIG. 2 is a schematic configuration diagram of an illumination device.

FIG. 2 is a side view of an illumination device.

Note that, in the drawings, the dimensions of some components may be scaled differently for ease of understanding for the components.

The projector of the present exemplary embodiment is an example of a projector that uses three transmissive type liquid crystal light valves as light modulation devices. Note that a reflective type liquid crystal light valve may also be used as a light modulation device. Further, a light modulation device other than liquid crystal may be used as the light modulation device, such as, for example, a device that uses a micromirror, such as a digital micromirror device (DMD).

As illustrated in FIG. 1, a projector 1 includes an illumination device 2, a color separation optical system 3, a light modulation device 4R, a light modulation device 4G, and a light modulation device 4B, a light synthesizing optical system 5, and a projection optical system 6. The projector 1 includes an optical device described below. The illumination device 2 emits illumination light WL. The color separation optical system 3 separates the illumination light WL from the illumination device 2 into red light LR, green light LG, and blue light LB. The light modulation device 4R, the light modulation device 4G, and the light modulation device 4B modulate the red light LR, the green light LG, and the blue light LB, respectively, in accordance with image information, and form imaging light of each color. The light synthesizing optical system 5 synthesizes the imaging light of each color from the respective light modulation devices 4R, 4G, 4B. The projection optical system 6 projects the synthesized imaging light from the light synthesizing optical system 5 toward a screen SCR.

As illustrated in FIG. 2, the illumination device 2 emits the illumination light WL of a white color including, among excitation light of a blue color emitted from a semiconductor laser, a portion of excitation light B of a blue color emitted without wavelength conversion, and fluorescence YL of a yellow color that is produced due to wavelength conversion of the excitation light B by a phosphor wheel 50. The illumination device 2 emits the illumination light WL adjusted to have a substantially uniform illuminance distribution toward the color separation optical system 3. A specific configuration of the illumination device 2 is described below.

As illustrated in FIG. 1, the color separation optical system 3 includes a first dichroic mirror 7a, a second dichroic mirror 7b, a first reflecting mirror 8a, a second reflecting mirror 8b, a third reflecting mirror 8c, and a relay lens 8d.

The first dichroic mirror 7a separates the illumination light WL emitted from the illumination device 2 into the red light LR and light including the green light LG and the blue light LB being mixed. Thus, the first dichroic mirror 7a transmits the red light LR, and reflects the green light LG and blue light LB. The second dichroic mirror 7b separates the light including the green light LG and the blue light LB being mixed, into the green light LG and the blue light LB. Thus, the second dichroic mirror 7b reflects the green light LG and transmits the blue light LB.

The first reflecting mirror 8a is disposed in the light path of the red light LR, and reflects the red light LR transmitted through the first dichroic mirror 7a toward the light modulation device 4R. The second reflecting mirror 8b and the third reflecting mirror 8c are disposed in the light path of the blue light LB, and guide the blue light LB transmitted through the second dichroic mirror 7b toward the light modulation device 4B.

The light modulation device 4R, the light modulation device 4G, and the light modulation device 4B are each constituted by a liquid crystal panel. The light modulation device 4R modulates the red light LR in accordance with image information while the red light LR passes through the light modulation device 4R, and forms red imaging light. Similarly, the light modulation device 4G modulates the green light LG in accordance with the image information while the green light LG passes through the light modulation device 4G, and forms green imaging light. The light modulation device 4B modulates the blue light LB in accordance with the image information while the blue light LB is passed through the light modulation device 4B, and forms blue imaging light. At each of the incident side and the exit side of each of the light modulation device 4R, the light modulation device 4G, and the light modulation device 4B, polarization plates (not illustrated) are disposed.

A field lens 10R that collimates the red light LR incident on the light modulation device 4R is provided at the incident side of the light modulation device 4R. A field lens 10G that collimates the green light LG incident on the light modulation device 4G is provided at the incident side of the light modulation device 4G. A field lens 10B that collimates the green light LB incident on the light modulation device 4B is provided at the incident side of the light modulation device 4B.

The light synthesizing optical system 5 is constituted by a cross dichroic prism. The light synthesizing optical system 5 synthesizes the imaging light of each color emitted from the light modulation device 4R, the light modulation device 4G, and the light modulation device 4B, respectively, and emits the imaging light thus synthesized toward the projection optical system 6.

The projection optical system 6 is constituted by a plurality of projection lenses. The projection optical system 6 enlarges and projects the imaging light synthesized by the light synthesizing optical system 5 toward the screen SCR. Thus, a color image thus enlarged is displayed on the screen SCR.

Illumination Device

Next, a configuration of the illumination device 2 will be described.

As illustrated in FIG. 2, the illumination device 2 includes an array light source 30 that emits excitation light, a collimating optical system 40, a light condensing optical system 42, the phosphor wheel 50, a pickup optical system 60, an integrator optical system 110, a polarization conversion element 120, and a superimposing lens 130.

The array light source 30 includes a plurality of semiconductor lasers 31 that emit blue light as the excitation light B that excites a phosphor layer 51 included in the phosphor wheel 50 described below. A peak emission intensity of the semiconductor laser 31 is approximately 445 nm, for example.

Note that the semiconductor laser 31 may emit color light having a peak wavelength other than 445 nm as long as the light is of a wavelength capable of exciting a phosphor layer (scattered light generating unit) 23 described below.

The collimating optical system 40 converts the excitation light B emitted from the array light source 30 into parallel light. The collimating optical system 40 is constituted by a plurality of collimating lenses 41 arranged in an array corresponding to an arrangement of the plurality of semiconductor lasers 31, for example. The excitation light B converted to parallel light by passing through the collimating optical system 40 is incident on the light condensing optical system 42.

The light condensing optical system 42 is constituted by, for example, a single convex lens. The light condensing optical system 42 is disposed on an optical axis of the excitation light B emitted from the array light source 30, and condenses the excited light B collimated by the light collimating optical system 40 onto the phosphor wheel 50.

The phosphor wheel 50 has a function of transmitting a portion of the excitation light B of a blue color emitted from the array light source 30 and converting the remaining portion of the excitation light B to fluorescence. The phosphor wheel 50 includes a rotating substrate 50a, the phosphor layer 51, a dichroic film 52, and a motor 55b. The rotating substrate 50a is formed from, for example, a glass or a resin having optical transparency.

The rotating substrate 50a is formed in a circular shape when viewed from a direction of a rotation axis O. However, an outer shape of the rotating substrate 50a is not limited to a circular shape, and may be, for example, a polygonal shape. The motor 55b rotates the rotating substrate 50a about the predetermined rotation axis O. The rotating substrate 50a rotates in a plane substantially orthogonal to an optical axis of the excitation light B incident on the rotating substrate 50a. The phosphor layer 51 contains phosphor particles that absorb the remaining portion of the excitation light B and emit the fluorescence YL of a yellow color including red light and green light. The peak emission intensity of the fluorescence YL is approximately 550 nm, for example.

As the phosphor particles, for example, yttrium aluminum garnet (YAG) group fluorescent substances are used. Note that the material for forming the phosphor particles may be one type or may be a mixture of particles formed using two or more types of materials.

The dichroic film 52 is provided between the phosphor layer 51 and the rotating substrate 50a. The dichroic film 52 transmits the excitation light B and reflects the fluorescence YL.

The fluorescence YL and a portion of the excitation light B transmitted through the phosphor layer 51, that is, blue light B1, are synthesized, thereby generating the illumination light WL of a white color. That is, the illumination light WL is constituted by light including the fluorescence YL and the excitation light B of laser light.

The pickup optical system 60 is constituted by, for example, a pickup lens 61 and a pickup lens 62. The pickup optical system 60 captures and substantially collimates the illumination light WL emitted from the phosphor layer 51, and then emits the illumination light WL thus collimated toward the integrator optical system 110.

The integrator optical system 110 includes a first lens array 111 and a second lens array 112. The first lens array 111 includes a plurality of lenses arranged in a matrix. The second lens array 112 includes a plurality of lenses corresponding to the plurality of lenses of the first lens array 111. The first lens array 111 divides the illumination light WL from the pickup optical system 60 into a plurality of light beams and condenses each light beam. The second lens array 112 emits the light beams from the first lens array 111 at a predetermined divergence angle.

The polarization conversion element 120 converts light emitted from the second lens array 112 into linearly polarized light. The polarization conversion element 120 is provided with, for example, a polarization separation film and a phase difference plate (not illustrated in the drawings). That is, the polarization conversion element 120 converts unpolarized light to uni-directional linearly polarized light.

The superimposing lens 130 superimposes a plurality of the light beams emitted from the polarization conversion element 120 in the respective illuminated regions of the light modulation device 4R, the light modulation device 4G, and the light modulation device 4B. That is, the second lens array 112 and the superimposing lens 130 form an image of each lens of the first lens array 111 in the vicinity of an image formation region of the light modulation device 4R, the light modulation device 4G, and the light modulation device 4B.

Optical Device

The optical device of the present exemplary embodiment will now be described.

Figure 3:
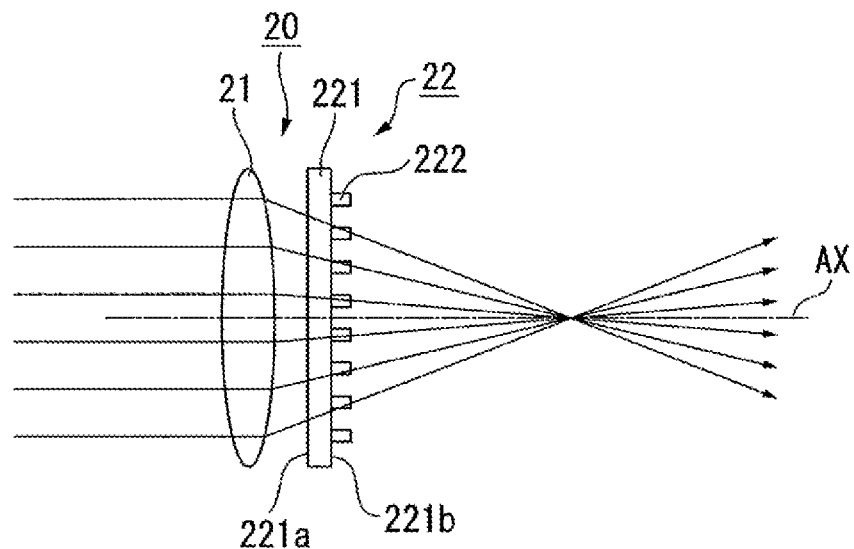
FIG. 3 is a side view of an optical device.

FIG. 3 is a side view of an optical device 20.

In the projector 1 illustrated in FIG. 1, the optical device 20 of the present exemplary embodiment can be applied to a light condensing element such as, for example, the collimating lens 41, the superimposing lens 130, the relay lens 8d, and the field lenses 10R, 10G, 10B.

As illustrated in FIG. 3, the optical device 20 includes a lens 21 (optical element) and an aberration correction element 22. The lens 21 is constituted by a spherical lens. The aberration correction element 22 is provided at a light emission side of the lens 21 and corrects aberration caused by the lens 21.

Figure 4:
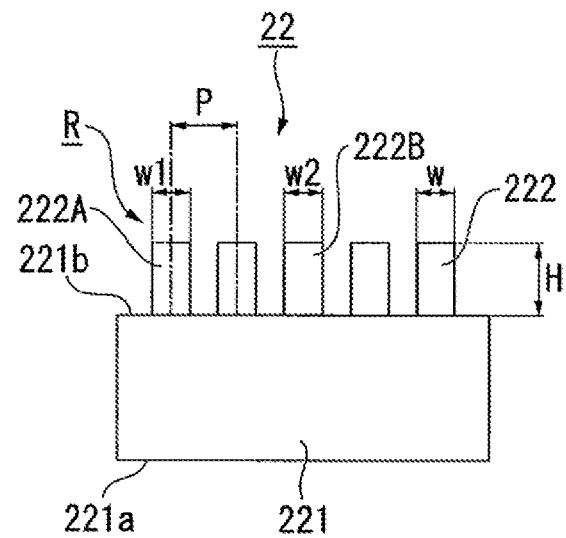
FIG. 4 is a side view of an aberration correction element.

FIG. 4 is a side view of the aberration correction element 22.

The aberration correction element 22 includes a substrate 221 (base material) and a plurality of columnar structures 222 provided at a second surface 221b of the substrate 221. When viewed from a normal direction of the substrate 221, the plurality of columnar structures 222 are provided periodically in a two-dimensional manner. The plurality of columnar structures 222 are provided across the entire region of the second surface 221b of the substrate 221. The columnar structure 222 has a diameter in the nm order and is also referred to as a nano-pillar or the like.

The columnar structure 222 is formed from a dielectric material having a high refractive index, such as titanium oxide ($TiO_2$), silicon nitride (SiN), and gallium phosphide (GaP), for example. Further, the shape of the columnar structure 222 is rotationally symmetric shape, such as a cylindrical shape or a rectangular parallelepiped shape. The substrate 221 is constituted by a light-transmitting substrate such as glass ($SiO_2$) having a refractive index lower than the refractive index of the columnar structure 222. Light emitted from the lens 21 is incident on a first surface 221a of the substrate 221 and emitted from the second surface 221b.

The plurality of columnar structures 222 have a refractive index and a pitch such that a waveguide effect with respect to incident light is produced. The refractive index of the columnar structure 222 is within a range of about from 2.2 to 4.0. For example, the refractive index of $TiO_2$, SiN, and GaP, which are the materials of the columnar structure 222, are about from 2.28 to 2.42, about from 2.0 to 2.1, and about from 3.1 to 4.0, respectively.

A pitch P between adjacent columnar structures 222 is about from 100 to 700 nm and, as an example of the present exemplary embodiment, is 250 nm. The pitches P between the columnar structures 222 may be constant between all adjacent columnar structures 222 or may be different from each other. Further, a height H of the columnar structure 222 is about from 100 to 1000 nm and, as an example of the present exemplary embodiment, is 600 nm. The height H of the columnar structure 222 is constant for all columnar structures 222.

A diameter W of the columnar structure 222 is about from 50 to 700 nm. Further, of the plurality of columnar structures 222, given one arbitrary columnar structure as a first columnar structure 222A, and another columnar structure as a second columnar structure 222B, a diameter W1 of the first columnar structure 222A and a diameter W2 of the second columnar structure 222B differ from each other. As an example of the present exemplary embodiment, the diameter W1 of the first columnar structure 222A is 100 nm and the diameter W2 of the second columnar structure 222B is 500 nm, for example. That is, the diameter W of the columnar structure 222 is not constant for all columnar structures 222, and the diameter W of at least a portion of the columnar structures 222 differs from the diameter W of the other columnar structures 222.

The aberration correction element 22 acts as an optical resonator of a nano-order size due to a light confinement effect within a formation region R of the columnar structure 222. Further, as described below, the aberration correction element 22, by being provided with the columnar structures 222 having different diameters W, can modulate the phase of light passing through the aberration correction element 22, and can correct aberration caused by other optical elements.

Phase modulation is achieved by a waveguide effect in the formation region R of the columnar structure 222. Given A as the wavelength of incident light, neff as the effective refractive index of the columnar structure 222, and H as the height of the columnar structure 222, a phase modulation amount φ is expressed by the following equation (1).

$$\Phi = 2\pi/\lambda \times (n_{eff} \times H) \quad (1)$$

The waveguide mode of the light in the aberration correction element 22 will now be described.

When light is incident on the formation region R of the columnar structure 222, a waveguide of the light resulting from two waveguide modes described below is produced.

Figure 6:
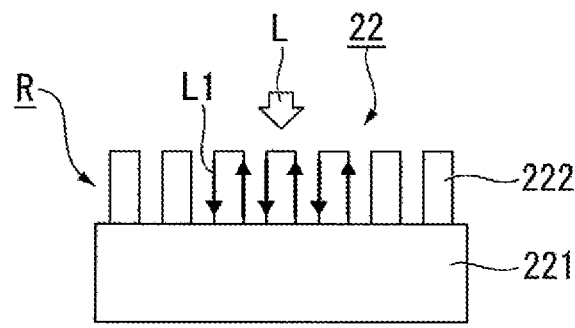
FIG. 6 is a schematic diagram illustrating a concept of a vertical waveguide mode.
Figure 7:
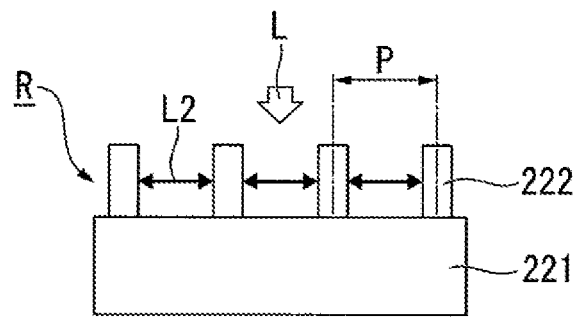
FIG. 7 is a schematic diagram illustrating a concept of a horizontal waveguide mode.

FIG. 6 is a schematic view illustrating a concept of a vertical waveguide mode. FIG. 7 is a schematic view illustrating a concept of a horizontal waveguide mode.

As illustrated in FIG. 6, light L vertically incident on the aberration correction element 22 is reflected vertically at the interface between the formation region R of the columnar structure 222 and space of an outer side thereof, and thus reflected light L1 travels back and forth within the formation region R of the columnar structure 222 and is guided while producing resonance. This waveguide mode is referred to as a vertical waveguide mode. The vertical waveguide mode is a waveguide mode that is produced based on the same principle as the Fabry-Perot resonator.

Further, light incident on the aberration correction element 22 is diffracted by a predetermined angle in accordance with the pitch P of the columnar structures 222. At this time, the plurality of columnar structures 222 act as a diffraction lattice. In particular, under conditions where the diffraction angle is 90°, diffraction light L2 is guided in a direction perpendicular to the incident light L, as illustrated in FIG. 7. This waveguide mode is referred to as a horizontal waveguide mode.

In the aberration correction element 22, the propagation of light by the vertical waveguide mode and the propagation of light by the horizontal waveguide mode overlap in the air, and the phase of the light emitted from the aberration correction element 22 is determined.

Here, the effective refractive index neff in equation (1) depends on the diameter W of the columnar structure 222. As a result, the larger the diameter W of the columnar structure 222, the greater the confinement of light, resulting from the basic mode, into the columnar structure 222. Thus, varying the diameter W of the columnar structure 222 changes the waveguide mode as well as the effective refractive index neff. As a result, even when the height of the columnar structure 222 is constant, phase modulation is possible.

Figure 5:
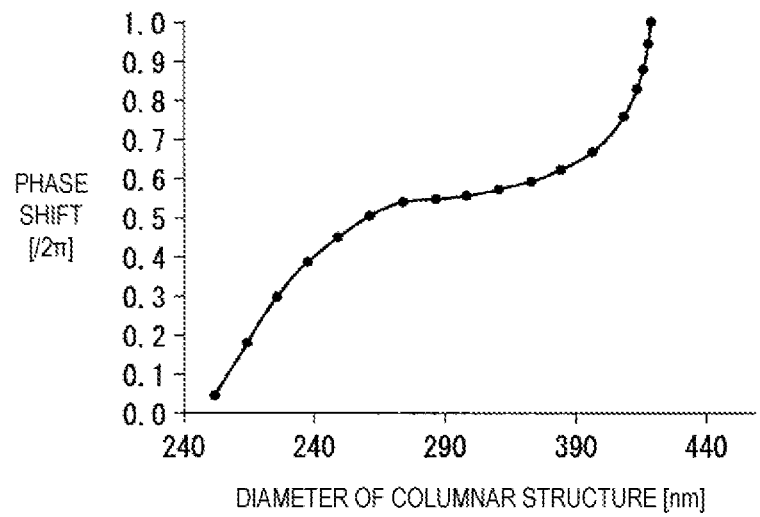
FIG. 5 is a graph illustrating a relationship between a diameter of a columnar structure and a phase shift amount.

Here, the present inventors performed a simulation of the amount of phase shift in a case where the diameter W of the columnar structure 222 was changed, using the finite-difference time-domain (FDTD) method. Here, only the diameter W of the columnar structure 222 was changed, and the interval and height of the columnar structure 222 was kept constant. A graph of the simulation results is illustrated in FIG. 5. The horizontal axis of the graph is the diameter of the columnar structure (nm) and the vertical axis of the graph is the amount of phase shift (/2π).

As illustrated in FIG. 5, when the diameter W of the columnar structure 222 was changed from 250 nm to 420 nm, the phase shift amount (/2π) changed from approximately 0.05 to 1. That is, it was found that when the diameter W of the columnar structure 222 is increased, the amount of phase modulation can be increased. Thus, when the diameter W of the columnar structure 222 is changed according to the position in the irradiation region of light, it is possible to change the amount of phase modulation locally. As described above, according to the aberration correction element 22 of the present exemplary embodiment, aberration can be corrected by changing the diameter W of the columnar structure 222 according to position, and changing the amount of the phase modulation locally.

Figure 8:
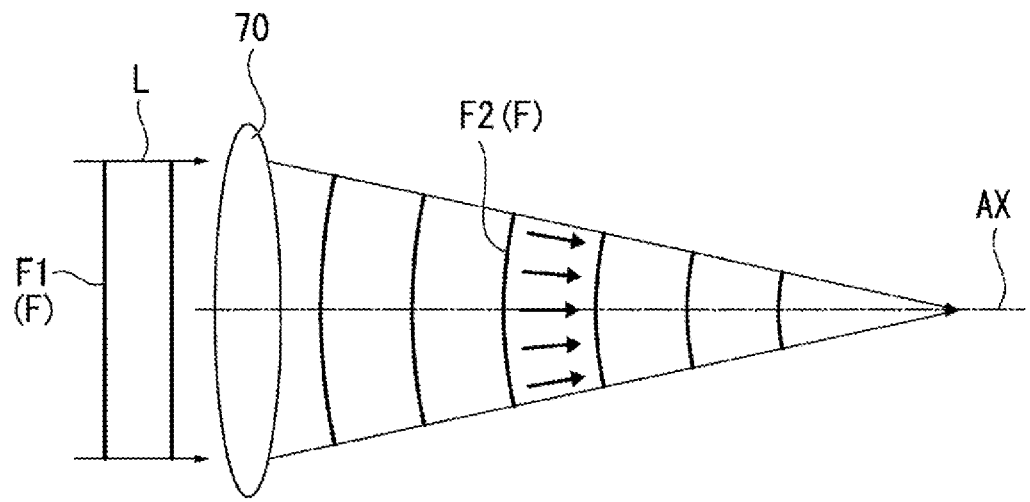
FIG. 8 illustrates an equiphase surface when light is transmitted through a normal lens.
Figure 9:
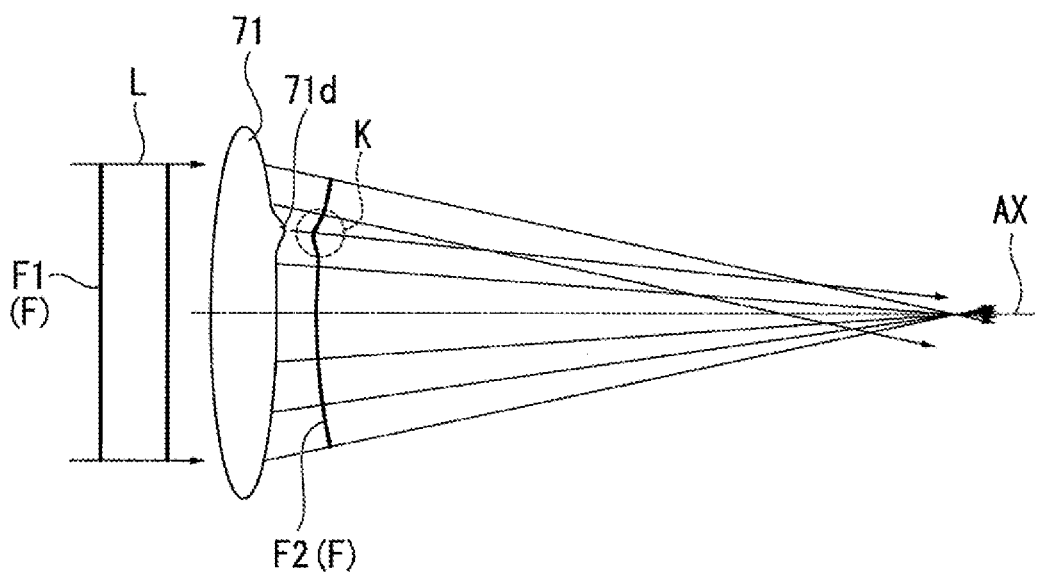
FIG. 9 illustrates an equiphase surface when light is transmitted through a lens with a defect.

Here, the reasons why aberration correction is made possible by locally changing the amount of phase modulation will be briefly described using FIG. 8 and FIG. 9.

FIG. 8 illustrates an equiphase surface F when the light L is transmitted through a lens 70, which is a normal lens.

By making the phase modulation amount of a portion of a wavefront of the light different from the phase modulation amount of other portions, it is possible to change a direction of travel of the light. Conversely, a change in the direction of travel does not occur even when the phase is delayed by the same phase modulation amount for the entire wavefront of the light.

For example, as illustrated in FIG. 8, the lens 70 may also be considered as a phase modulation element. In the lens 70, the light L passing through a position near an end of the lens 70 advances the equiphase surface F by decreasing the amount of phase modulation, that is, by reducing the phase delay. Conversely, the light L passing through a position near an optical axis AX of the lens 70 delays the equiphase surface F to a greater degree than the light at the lens end by increasing the amount of phase modulation, that is, by increasing the phase delay. In this manner, with phase modulation of different modulation amounts according to the position of the lens 70, wavefront conversion is performed from a plane wave F1 prior to lens incidence to a spherical wave F2 after lens transmission, and the direction of travel of the light is changed, forming focused light, which is condensed at one point, from parallel light.

FIG. 9 illustrates the equiphase surface F when the light L is transmitted through a lens 71 with a defect.

Aberration, which results in display quality deterioration, such as blurriness or distortion of an image, is caused by the wavefront of the light L falling out of an ideal state and deviating from the direction of travel of the light L.

For example, as illustrated in FIG. 9, in a case where there is a flaw 71d in a portion of the lens 71, distortion K of the equiphase surface F, that is, deviation from the spherical wave, is produced at a position corresponding to the flaw 71d. As a result, the light L does not condense at one point, resulting in blurriness or distortion of the image.

Therefore, according to the optical device 20 of the present exemplary embodiment, phase modulation can be locally performed by differentiating the diameter W of, among the plurality of columnar structures 222 of the aberration correction element 22, the columnar structure 222 corresponding to a position corresponding to the distortion K of the equiphase surface F resulting from the lens 21 from the diameter W of the other columnar structures 222 by an appropriate dimension. This allows the aberration correction element 22 to correct the deviation of the light L from the ideal spherical wave. As a result, the optical device 20 having a compact shape and minimal image quality deterioration caused by various aberrations such as spherical aberration, comma aberration, astigmatism, image surface curvature, and distortion aberration can be realized.

In the optical device 20 of the present exemplary embodiment, the lens 21 and the aberration correction element 22 are configured as separate members, making it easier to manufacture the aberration correction element 22 and obtain the desired correction performance.

In addition, in the present exemplary embodiment, because the shape of the columnar structure 222 is a columnar, rectangular parallelepiped, or other rotationally symmetric shape, the effect of structural birefringence does not occur in the aberration correction element 22, and the effect of aberration correction is obtained without relying on the polarization state of the incident light. Note that the shape of the columnar structure 222 need not be rotationally symmetric, such as a cylindrical shape or a rectangular parallelepiped shape.

With use of the optical device 20 described above, the projector 1 according to the present exemplary embodiment can achieve a high resolution of the projected image, a superior display quality, and a reduced size.

Second Exemplary Embodiment

Below, a second exemplary embodiment according to the present disclosure will be described with reference to FIG. 10.

The basic configuration of an optical device according to the second exemplary embodiment is similar to that of the first exemplary embodiment, and the arrangement of the plurality of columnar structures differs from that in the first exemplary embodiment. Therefore, the overall configuration of the optical device will not be described.

Figure 10:
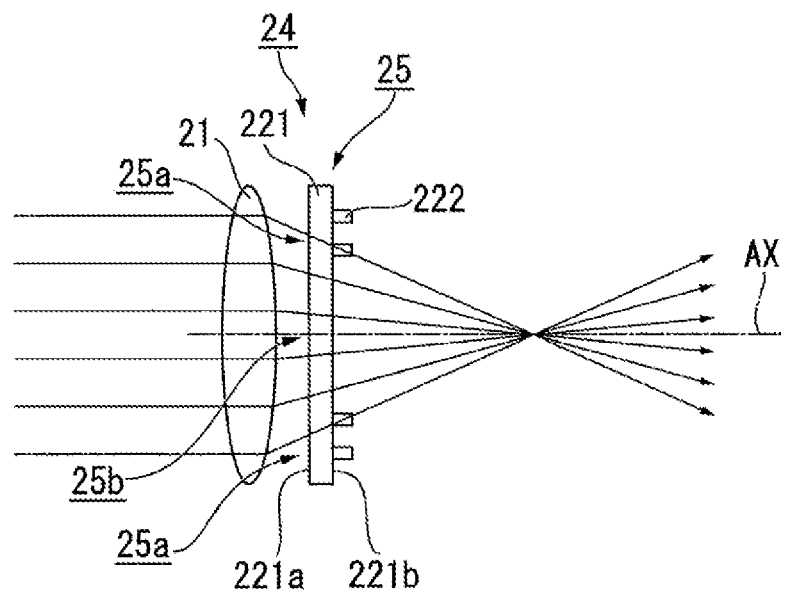
FIG. 10 is a side view of an optical device according to a second exemplary embodiment.

FIG. 10 is a side view of an optical device 24 according to the second exemplary embodiment.

In FIG. 10, the components common to those of FIG. 3 of the first exemplary embodiment are denoted using the same reference numerals, and the descriptions thereof are omitted.

As illustrated in FIG. 10, the optical device 24 of the present exemplary embodiment includes the lens 21 and the aberration correction element 25. The aberration correction element 25 includes the substrate 221 (base material) and the plurality of columnar structures 222 provided at the second surface 221b of the substrate 221. The plurality of columnar structures 222 are not provided in a center portion of the second surface 221b of the substrate 221 near the optical axis of the lens 21 in the irradiation region of incident light, but are provided at a peripheral portion away from the optical axis. That is, the aberration correction element 25 includes a first region 25a provided with the columnar structures 222 in an irradiation region of the incident light, and a second region 25b not provided with the columnar structures 222 in an irradiation region of the incident light. The first region 25a provided with the columnar structures 222 corresponds to a region where the equiphase surface F of the light L is locally distorted and phase modulation is necessary, as described with reference to the example in FIG. 9.

The other components of the optical device 24 are the same as those in the first exemplary embodiment.

In the present exemplary embodiment as well, the same effects as those of the first exemplary embodiment, such as the optical device 24 having a compact shape and minimal image quality deterioration caused by various aberrations, can be achieved.

In the aberration correction element, loss in the amount of light may be produced due to factors such as the production of light confinement in the columnar structure 222 caused by the waveguide effect, and deviation of a portion of emitted light from the phase of the design value, resulting in a noise component. In response to this problem, according to the optical device 24 of the present exemplary embodiment, the columnar structure 222 is provided only in the first region 25a, which is a partial region where phase modulation correction is required, making it possible to minimize the reduction in the amount of light.

Third Exemplary Embodiment

Below, a third exemplary embodiment according to the present disclosure will be described with reference to the FIG. 11.

The basic configuration of an optical device according to the third exemplary embodiment is similar to that of the first exemplary embodiment, but the arrangement of the plurality of columnar structures differs from that in the first exemplary embodiment. Therefore, the overall configuration of the optical device will not be described.

Figure 11:
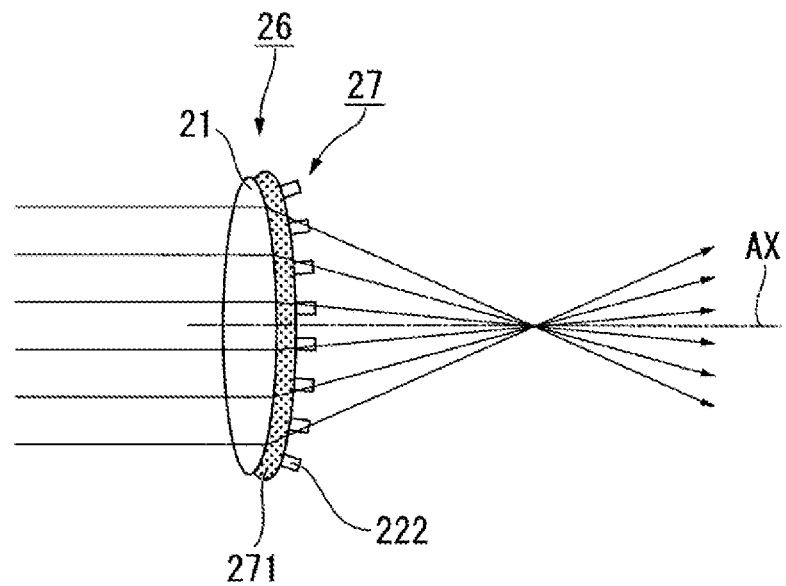
FIG. 11 is a side view of an optical device according to a third exemplary embodiment.

FIG. 11 is a side view of an optical device 26 according to the third exemplary embodiment.

In FIG. 11, the components common to those of FIG. 3 of the first exemplary embodiment are denoted using the same reference numerals, and the descriptions thereof are omitted.

As illustrated in FIG. 11, the optical device 26 of the present exemplary embodiment includes the lens 21 and an aberration correction element 27. The aberration correction element 27 is constituted by the plurality of columnar structures 222 and may include a low refractive index layer 271. The plurality of columnar structures 222 are provided across the entire region of the light emitting surface of the lens 21. That is, the optical device 26 of the present exemplary embodiment has a configuration in which the lens 21 and the aberration correction element 27 are integrated.

The low refractive index layer 271 is provided between the columnar structure 222 and the lens 21 and is formed from a material having a refractive index lower than the refractive index of the columnar structure 222. Because the refractive index of the low refractive index layer 271 is lower than the refractive index of the columnar structure 222, the light confinement effect of the columnar structure 222 is not inhibited. For example, $SiO_2$ or the like is used as the constituent material of the low refractive index layer 271. The refractive index of the low refractive index layer 271 is, for example, about from 1.3 to 2.1. As described in the first exemplary embodiment, because the refractive index of the columnar structure 222 is about from 2.2 to 4.0, the difference between the refractive index of the columnar structure 222 and the refractive index of the low refractive index layer 271 may be 0.1 or greater.

The other components of the optical device 26 are the same as those in the first exemplary embodiment.

In the present exemplary embodiment as well, the same effects as those of the first exemplary embodiment, such as the optical device 26 having a compact shape and minimal image quality deterioration caused by various aberrations, can be achieved.

When using an aberration correction element including a columnar structure, precise alignment of the lens with the aberration correction element is required when the lens and aberration correction element are separate. In response, in the optical device 26 of the present exemplary embodiment, because the lens 21 and the aberration correction element 27 are integral optical members, alignment work between the lens 21 and the aberration correction element 27 in the assembly step of the projector 1 can be eliminated.

Furthermore, in the optical device 26 of the present exemplary embodiment, a periphery of the columnar structure 222 may be covered by the low refractive index layer 271. According to this configuration, the light confinement effect of the columnar structure 222 is reliably expressed. Furthermore, because the columnar structure 222 is protected by the low refractive index layer 271, it is easier to handle the optical device 26 during the step of assembling the projector 1.

Fourth Exemplary Embodiment

Below, a fourth exemplary embodiment according to the present disclosure will be described with reference to FIG. 12.

The basic configuration of an optical device according to the fourth exemplary embodiment is similar to that of the third exemplary embodiment, but the arrangement of the plurality of columnar structures differs from that in the third exemplary embodiment. Therefore, the overall configuration of the optical device will not be described.

Figure 12:
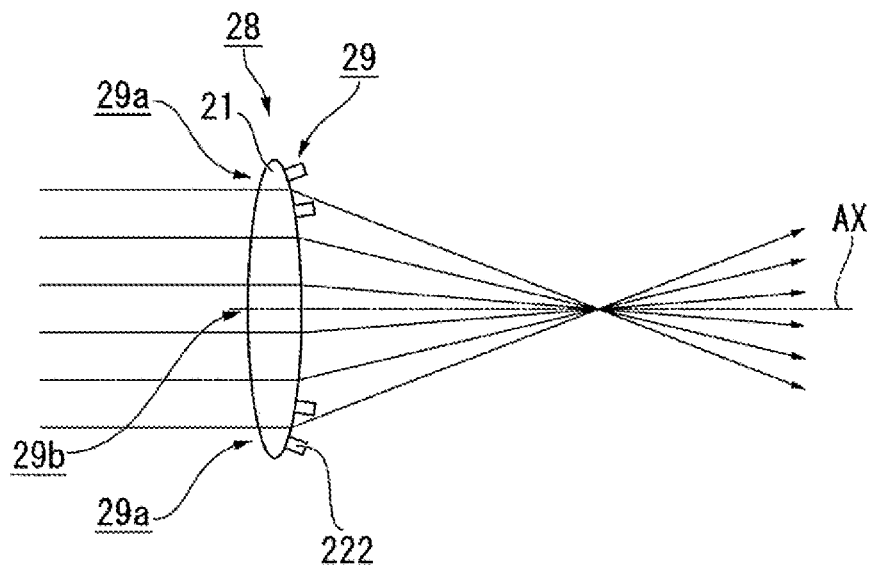
FIG. 12 is a side view of an optical device according to a fourth exemplary embodiment.

FIG. 12 is a side view of the optical device 28 according to the fourth exemplary embodiment.

In FIG. 12, the components common to those of FIG. 11 of the third exemplary embodiment are denoted using the same reference numerals, and the descriptions thereof are omitted.

As illustrated in FIG. 12, an optical device 28 of the present exemplary embodiment includes the lens 21 and an aberration correction element 29. The aberration correction element 29 includes the plurality of columnar structures 222. The plurality of columnar structures 222 are not provided in the center portion of the light emitting surface of the lens 21 near the optical axis AX of the lens 21 in the irradiation region of incident light, but are provided at a peripheral portion away from the optical axis AX. That is, the aberration correction element 29 includes a first region 29a provided with the columnar structures 222 in an irradiation region of the incident light, and a second region 29b not provided with the columnar structures 222 in an irradiation region of the incident light. That is, the optical device 28 has a configuration in which the lens 21 and the aberration correction element 29 are integrated. Note that, similar to the third exemplary embodiment, the low refractive index layer 271 may be provided around the plurality of columnar structures 222.

The other components of the optical device 28 are the same as those in the first exemplary embodiment.

In the present exemplary embodiment as well, the same effects as those of the first exemplary embodiment, such as the optical device 28 having a compact shape and minimal image quality deterioration caused by various aberrations, can be achieved.

Further, in the present exemplary embodiment, the same effects as those of the second exemplary embodiment, such as minimization of the reduction in the amount of light, and the third element, such as elimination of the need for alignment work between the lens 21 and the aberration correction element 29, are achieved.

Fifth Exemplary Embodiment

Below, a fifth exemplary embodiment according to the present disclosure will be described with reference to FIG. 13.

The basic configuration of an optical device according to the fifth exemplary embodiment is similar to that of the third exemplary embodiment, but the arrangement of the plurality of columnar structures differs from that in the third exemplary embodiment. Therefore, the overall configuration of the optical device will not be described.

Figure 13:
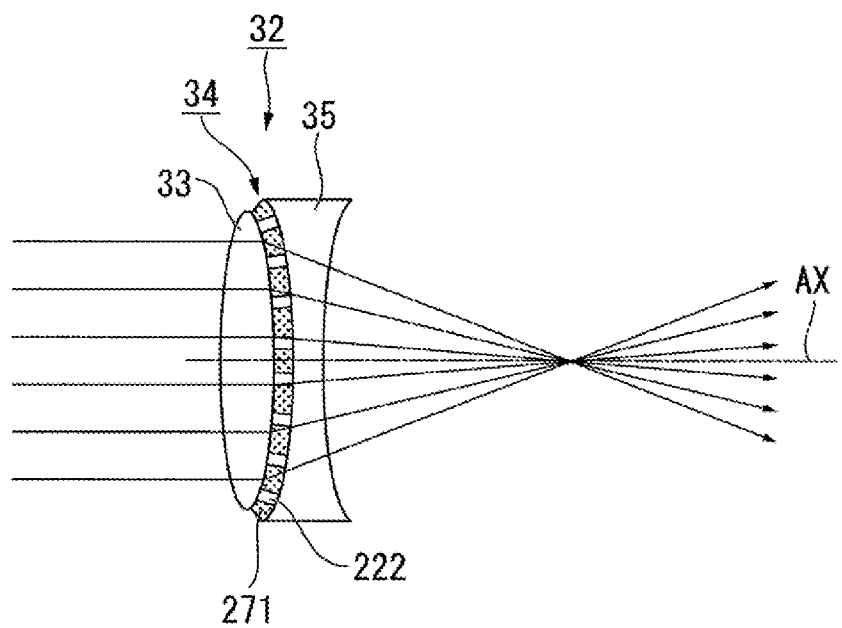
FIG. 13 is a side view of an optical device according to a fifth exemplary embodiment.

FIG. 13 is a side view of the optical device according to the fifth exemplary embodiment.

In FIG. 13, the components common to those of FIG. 11 of the third exemplary embodiment are denoted using the same reference numerals, and the descriptions thereof are omitted.

As illustrated in FIG. 13, an optical device 32 of the present exemplary embodiment includes a first lens 33, an aberration correction element 34, and a second lens 35. The first lens 33 is constituted by a convex lens. The second lens 35 is constituted by a concave lens. The aberration correction element 34 includes the plurality of columnar structures 222 and the low refractive index layer 271. The plurality of columnar structures 222 are provided across the entire region of the light emitting surface of the first lens 33. The second lens 35 is disposed facing the first lens 33 via the plurality of columnar structures 222 and the low refractive index layer 271. That is, in the optical device 32 of the present exemplary embodiment, the plurality of columnar structures 222 are sandwiched between the first lens 33 and the second lens 35, and the first lens 33, the aberration correction element 34, and the second lens 35 are integrated.

The other components of the optical device 32 are the same as those in the third exemplary embodiment.

In the present exemplary embodiment as well, the same effects as those of the first exemplary embodiment, such as the optical device 32 having a compact shape and minimal image quality deterioration caused by various aberrations, can be achieved.

Further, in the present exemplary embodiment, because the first lens 33, the aberration correction element 34, and the second lens 35 are integrated, highly accurate aberration correction typically performed using a triplet lens, a freeform curved lens, or the like can be achieved with the small-sized optical device 32.

Sixth Exemplary Embodiment

Below, a sixth exemplary embodiment according to the present disclosure will be described with reference to FIG. 14.

The basic configuration of an optical device according to the sixth exemplary embodiment is similar to that of the first exemplary embodiment, but the configuration of the aberration correction element differs from that in the first exemplary embodiment. Therefore, the overall configuration of the optical device will not be described.

Figure 14:
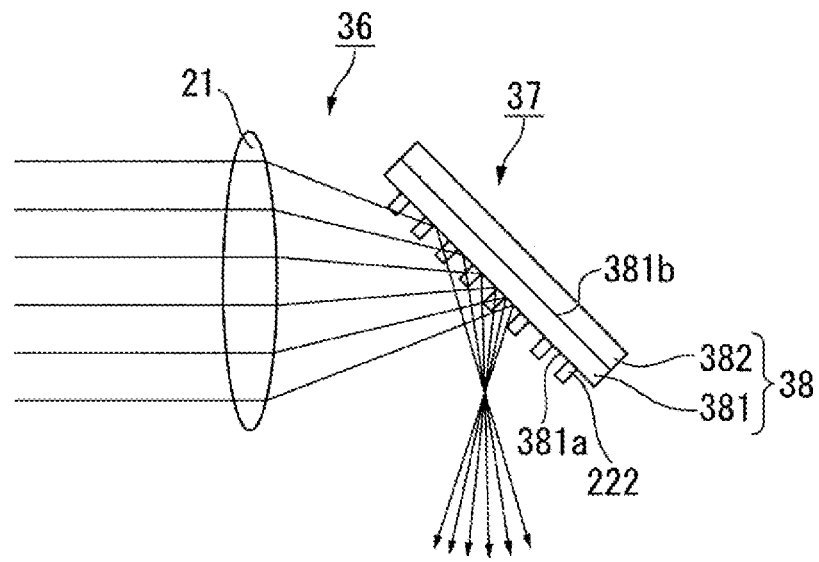
FIG. 14 is a side view of an optical device according to a sixth exemplary embodiment.

FIG. 14 is a side view of the optical device according to the sixth exemplary embodiment.

In FIG. 14, the components common to those of FIG. 3 of the first exemplary embodiment are denoted using the same reference numerals, and the descriptions thereof are omitted.

While a transmission-type aberration correction element is used in the optical devices according to the first to fifth exemplary embodiments, a reflection-type aberration correction element is used in the sixth exemplary embodiment. Accordingly, the optical device of the present exemplary embodiment can be applied to a location in the projector 1 illustrated in FIG. 1 in which a reflective element such as, for example, the first reflecting mirror 8a, the second reflecting mirror 8b, the third reflecting mirror 8c, is used.

As illustrated in FIG. 14, an optical device 36 of the present exemplary embodiment includes the lens 21 and an aberration correction element 37. The aberration correction element 37 includes a substrate 38 and the plurality of columnar structures 222 provided at the substrate 38. The substrate 38 includes a foundation layer 381 provided with a first surface 381a and a second surface 381b, and a reflection layer 382 provided at the second surface 381b of the foundation layer 381.

For example, SiO$_2$ or the like is used as the constituent material of the foundation layer 381. The foundation layer 381 has a refractive index lower than the refractive index of the columnar structure 222. The refractive index of the foundation layer 381 is, for example, about from 1.3 to 2.1. As described in the first exemplary embodiment, because the refractive index of the columnar structure 222 is about from 2.2 to 4.0, the difference between the refractive index of the columnar structure 222 and the refractive index of the foundation layer 381 may be 0.1 or greater. Further, a metal film having high reflectivity or a dielectric multilayer film is used as the constituent material of the reflection layer 382.

With the aberration correction element 37 of the present exemplary embodiment being a reflection-type aberration correction element, light emitted from the lens 21 is incident on the first surface 381a of the foundation layer 381, is reflected by the reflection layer 382, and emitted from the first surface 381a of the foundation layer 381 toward an optical system of a subsequent stage.

The other components of the optical device 36 are the same as those in the first exemplary embodiment.

In the present exemplary embodiment as well, because the aberration correction element 37 and the reflecting mirror are integrated, the optical device 36 having a compact shape and minimal image quality deterioration caused by various aberrations can be achieved.

Seventh Exemplary Embodiment

Below, a seventh exemplary embodiment according to the present disclosure will be described with reference to FIG. 15. The basic configuration of an optical device according to the seventh exemplary embodiment is similar to that of the sixth exemplary embodiment, but the arrangement of the plurality of columnar structures differs from that in the sixth exemplary embodiment. Therefore, the overall configuration of the optical device will not be described.

Figure 15:
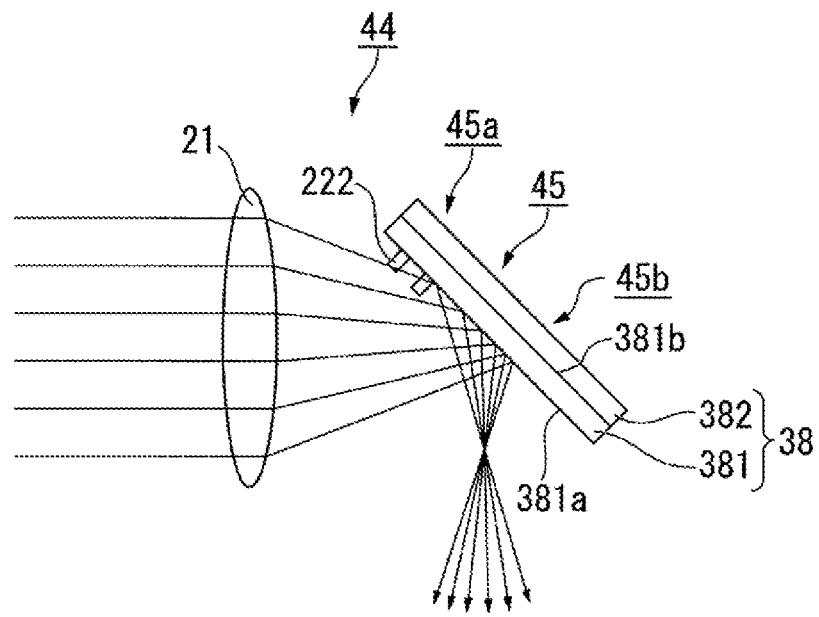
FIG. 15 is a side view of an optical device according to a seventh exemplary embodiment.

FIG. 15 is a side view of the optical device according to the seventh exemplary embodiment.

In FIG. 15, the components common to those of FIG. 14 of the sixth exemplary embodiment are denoted using the same reference numerals, and the descriptions thereof are omitted.

As illustrated in FIG. 15, an optical device 44 of the present exemplary embodiment includes the lens 21 and an aberration correction element 45. The plurality of columnar structures 222 are provided only in a partial region of the second surface of the substrate 38 in the irradiation region of incident light. That is, the aberration correction element 45 includes a first region 45a provided with the columnar structures 222 in the irradiation region of the incident light, and a second region 45b not provided with the columnar structures 222 in the irradiation region of the incident light.

The other components of the optical device 44 are the same as those in the first exemplary embodiment.

In the present exemplary embodiment as well, the same effects as those of the sixth exemplary embodiment, such as the optical device 44 having a compact shape and minimal image quality deterioration caused by various aberrations, can be achieved.

Further, according to the optical device 44 of the present exemplary embodiment, the columnar structure 222 is provided only in the first region 45a, which is a partial region where phase modulation correction is required, making it possible to minimize the reduction in the amount of light.

Eighth Exemplary Embodiment

Below, an eighth exemplary embodiment according to the present disclosure will be described with reference to FIG. 16. The basic configuration of an optical device according to the eighth exemplary embodiment is similar to that of the sixth exemplary embodiment, but the arrangement of the lens differs from that in the sixth exemplary embodiment. Therefore, the overall configuration of the optical device will not be described.

Figure 16:
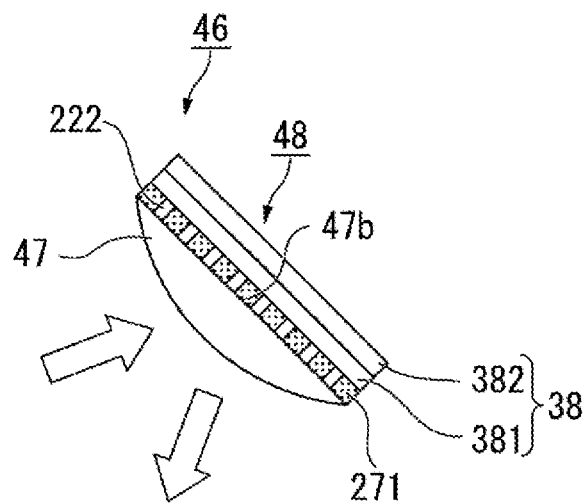
FIG. 16 is a side view of an optical device according to an eighth exemplary embodiment.

FIG. 16 is a side view of the optical device according to the eighth exemplary embodiment.

In FIG. 16, the components common to those of FIG. 14 of the sixth exemplary embodiment are denoted using the same reference numerals, and the descriptions thereof are omitted.

As illustrated in FIG. 16, an optical device 46 of the present exemplary embodiment includes a lens 47 and an aberration correction element 48. The aberration correction element 48 includes the substrate 38, the plurality of the columnar structures 222 provided at the substrate 38, and the low refractive index layer 271. The substrate 38 includes the foundation layer 381 and the reflection layer 382. The lens 47 is constituted by a plano-convex lens. The lens 47 is fixed to the aberration correction element 48 in an orientation in which a flat surface 47b faces the columnar structures 222. That is, the optical device 46 of the present exemplary embodiment has a configuration in which the reflection-type aberration correction element 48 and the lens 47 are integrated.

The other components of the optical device 46 are the same as those in the sixth exemplary embodiment.

In the present exemplary embodiment, because the lens 47, the aberration correction element 48, and the reflection layer 382 functioning as the reflecting mirror are integrated, the optical device 46 having a compact shape and minimal image quality deterioration caused by various aberrations can be achieved.

Further, in the optical device 46 of the present exemplary embodiment, because the lens 47 and the aberration correction element 48 are integral optical members, alignment work between the lens 47 and the aberration correction element 48 in the assembly step of the projector 1 can be eliminated.

Ninth Exemplary Embodiment

Below, a ninth exemplary embodiment according to the present disclosure will be described with reference to FIG. 17.

The basic configuration of an optical device according to the ninth exemplary embodiment is similar to that of the eighth exemplary embodiment, but the arrangement of the columnar structures differs from that in the eighth exemplary embodiment. Therefore, the overall configuration of the optical device will not be described.

Figure 17:
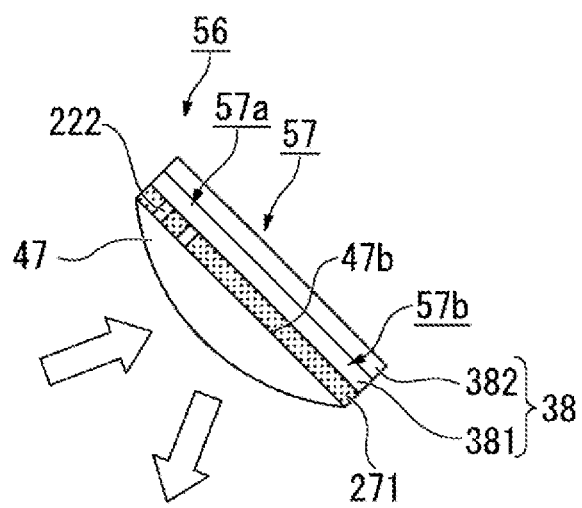
FIG. 17 is a side view of an optical device according to a ninth exemplary embodiment.

FIG. 17 is a side view of the optical device according to the ninth exemplary embodiment.

In FIG. 17, the components common to those of FIG. 16 of the eighth exemplary embodiment are denoted using the same reference numerals, and the descriptions thereof are omitted.

As illustrated in FIG. 17, an optical device 56 of the present exemplary embodiment includes the lens 47 and an aberration correction element 57. The plurality of columnar structures 222 are provided only in a partial region of the second surface of the substrate 38 in the irradiation region of incident light. That is, the aberration correction element 57 includes a first region 57a provided with the columnar structures 222 in the irradiation region of the incident light, and a second region 57b not provided with the columnar structures 222 in the irradiation region of the incident light.

The other components of the optical device 56 are the same as those in the eighth exemplary embodiment.

In the present exemplary embodiment as well, the same effects as those of the eighth exemplary embodiment, such as the optical device 56 having a compact shape and minimal image quality deterioration caused by various aberrations, can be achieved.

Further, according to the optical device 56 of the present exemplary embodiment, the columnar structure 222 is provided only in the first region 57a, which is a partial region where correction based on phase modulation is required, making it possible to minimize the reduction in the amount of light.

Tenth Exemplary Embodiment

Below, a tenth exemplary embodiment according to the present disclosure will be described with reference to FIG. 18.

The basic configuration of an optical device according to the tenth exemplary embodiment is similar to that of the first exemplary embodiment, but the waveguide mode differs from that in the first exemplary embodiment. Therefore, the overall configuration of the optical device will not be described.

Figure 18:
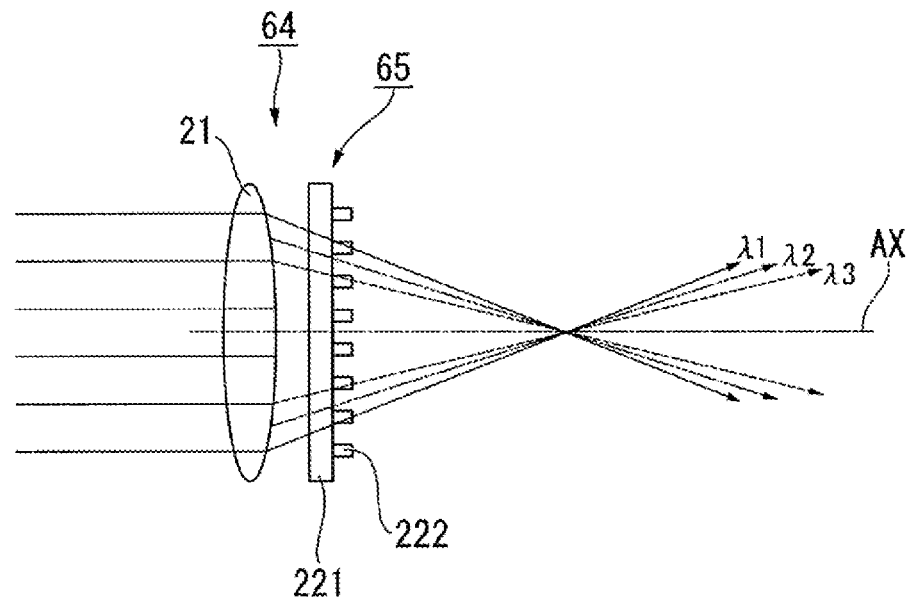
FIG. 18 is a side view of an optical device according to a tenth exemplary embodiment.

FIG. 18 is a side view of the optical device according to the tenth exemplary embodiment.

In FIG. 18, the components common to those of FIG. 3 of the first exemplary embodiment are denoted using the same reference numerals, and the descriptions thereof are omitted.

The optical devices according to the first to ninth exemplary embodiments are optical devices that use a single color light, and are capable of correcting various aberrations such as spherical aberration, coma aberration, astigmatism, image surface curvature, and distortion aberration. In contrast, the optical device according to the tenth exemplary embodiment is an optical device for light including a plurality of wavelengths, such as white light, for example, and is capable of correcting color aberration in addition to the aberrations described above. Accordingly, the optical device of the present exemplary embodiment can be applied to, for example, the projection optical system 6 of the projector 1 illustrated in FIG. 1.

As illustrated in FIG. 18, the configuration of an optical device 64 of the present exemplary embodiment is the same as that of the first exemplary embodiment. However, in an aberration correction element 65, the pitch between adjacent columnar structures 222 is greater than or equal to a wavelength of incident light within the columnar structure 222, and less than the wavelength in air, and the two waveguide modes need to satisfy the phase matching condition of $k = m \cdot 2n/U$, where k is a wavenumber, U is a pitch, and m is an integer. Thus, the plurality of columnar structures 222 can produce waveguide mode resonance with respect to incident light. Waveguide mode resonance is described below.

Figure 21:
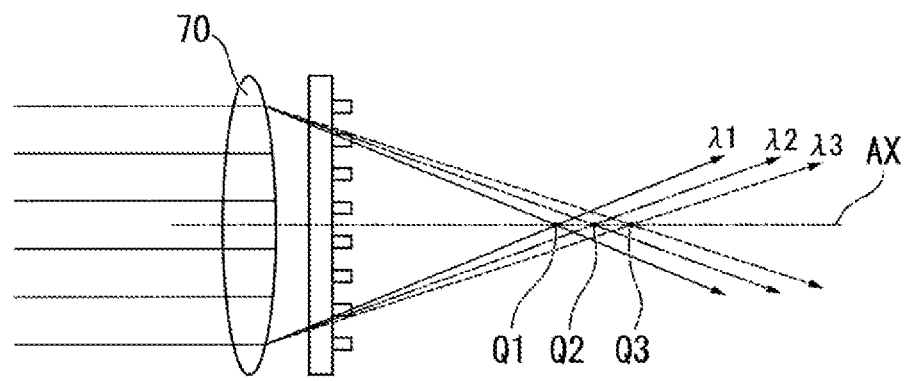
FIG. 21 is a diagram illustrating a color aberration of a spherical lens.

FIG. 21 is a diagram illustrating color aberration of the lens 70, which is a typical lens.

A typical lens materials has wavelength dispersion, and the refractive index of the lens varies according to wavelength. Thus, as illustrated in FIG. 21, imaging positions Q1, Q2 and Q3 by the lens 70 deviate back and forth on the optical axis AX depending on wavelengths λ1, λ2 and λ3. This phenomenon is color aberration.

According to the optical device 64 of the present exemplary embodiment, color aberration caused by the lens 21 can be corrected by the following actions.

Figure 19:
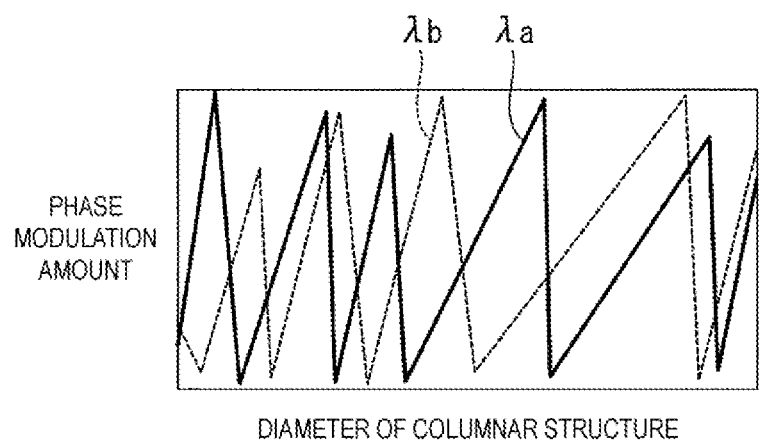
FIG. 19 is a graph illustrating a relationship between a diameter of a columnar structure and a phase shift amount when waveguide mode resonance is produced.

FIG. 19 is a graph illustrating a relationship between a diameter of a columnar structure and a phase shift amount when waveguide mode resonance is produced. The graph denoted by a reference sign λa indicates a relationship at a wavelength 500 nm, for example, and a graph denoted by a reference sign λb indicates a relationship at the wavelength 550 nm, for example.

When light is incident on the optical device 64 of the present exemplary embodiment, the actions produced in both the vertical waveguide mode illustrated in FIG. 6 and the horizontal waveguide mode illustrated in FIG. 7 are the same as those of the first exemplary embodiment. However, in the case of the present exemplary embodiment, because the pitch between the columnar structures 222 satisfies the phase matching condition for coupling the two waveguide modes, the diffracted light L2 in the horizontal waveguide mode and the incident light L are mutually intensified, and a strong standing wave is produced in the formation region R of the plurality of columnar structures 222. As a result, when the two waveguide modes overlap, a discontinuous phase modulation amount is obtained in response to changes in the diameter of the columnar structure 222, as illustrated in FIG. 19.

In a case where waveguide mode resonance is not generated, as illustrated in FIG. 5, the phase modulation amount varies continuously with respect to changes in the diameter of the columnar structure 222, and therefore different phase modulation amounts are obtained with respect to the wavelength of the incident light. On the other hand, when waveguide mode resonance is generated, the diameter of the columnar structure 222 having the same phase modulation amount even at different wavelengths as indicated by the intersection points between the solid line graph λa and the dashed line graph λb in FIG. 19 can be selected based on the phase modulation characteristics exhibiting discontinuity and abrupt change.

As a result, according to the optical device 64 of the present exemplary embodiment, a focal length can be equalized and color aberration can be corrected across a plurality of wavelengths. Thus, the optical device 64 of the present exemplary embodiment functions as an ultra-thin transmissive achromatic lens, and can be used in an optical system such as the projection optical system 6 of the projector 1.

With the optical device 64 of the tenth exemplary embodiment satisfying the conditions that the pitch between the columnar structures 222 is greater than or equal to the wavelength of incident light in the columnar structure 222 and less than the wavelength in air, and that the phase matching condition for coupling the two waveguide modes is satisfied, and being capable of correcting color aberration, the same modified examples as those of the second to ninth exemplary embodiments can be exemplified. The configurations of the optical devices described below are the same as those of the second to ninth exemplary embodiments, and thus simple descriptions are given without illustration. The effects inherent in the following exemplary embodiments are also the same as those of the second to ninth exemplary embodiments.

Eleventh Exemplary Embodiment

As illustrated in FIG. 10, in the optical device according to the tenth exemplary embodiment capable of color aberration correction, the aberration correction element may include a first region provided with the columnar structure, and a second region not provided with the columnar structure.

Twelfth Exemplary Embodiment

As illustrated in FIG. 11, in the optical device of the tenth exemplary embodiment capable color aberration correction, a plurality of columnar structures may be provided at the lens, and the lens and the aberration correction element may be integrated.

Thirteenth Exemplary Embodiment

As illustrated in FIG. 12, in the optical device of the tenth exemplary embodiment capable of color aberration correction, the lens and the aberration correction element may be integrated, and the aberration correction element may include a first region provided with the columnar structure, and a second region not provided with the columnar structure.

Fourteenth Exemplary Embodiment

As illustrated in FIG. 13, in the optical device of the tenth exemplary embodiment capable of color aberration correction, the plurality of columnar structures may be provided between the first lens and the second lens, and the first lens, the aberration correction element, and the second lens may be integrated.

Fifteenth Exemplary Embodiment

As illustrated in FIG. 14, in the optical device of the tenth exemplary embodiment capable of color aberration correction, the optical device may be a reflection-type optical device in which aberration correction element includes a reflection layer.

Sixteenth Exemplary Embodiment

As illustrated in FIG. 15, in the optical device according to the tenth exemplary embodiment capable of color aberration correction, the aberration correction element may include a reflection layer, and further include a first region provided with the columnar structure, and a second region not provided with the columnar structure.

Seventeenth Exemplary Embodiment

As illustrated in FIG. 16, in the optical device of the tenth exemplary embodiment capable of color aberration correction, the lens and the reflection-type aberration correction element may be integrated.

Eighteenth Exemplary Embodiment

As illustrated in FIG. 17, in the optical device of the tenth exemplary embodiment capable of color aberration correction, the lens and the reflection-type aberration correction element may be integrated, and the aberration correction element may include a first region provided with the columnar structure, and a second region not provided with the columnar structure.

Nineteenth Exemplary Embodiment

Below, a nineteenth exemplary embodiment according to the present disclosure will be described with reference to FIG. 20.

The configuration of an optical device according to the nineteenth exemplary embodiment is similar to that of the first exemplary embodiment, but the aberration correction element differs from that in the first exemplary embodiment. Therefore, the overall configuration of the optical device will not be described.

Figure 20:
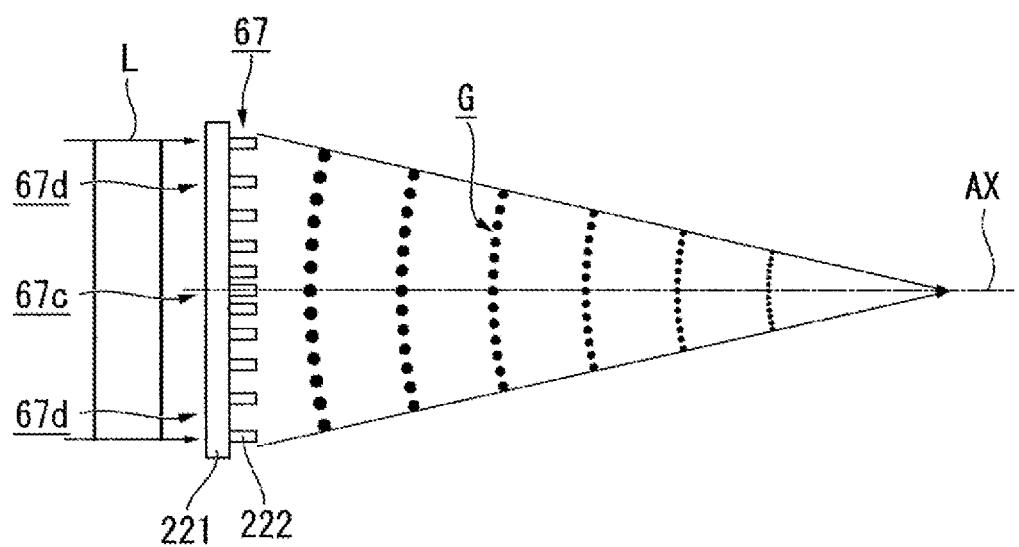
FIG. 20 is a side view of the aberration correction element of a nineteenth exemplary embodiment.

FIG. 20 is a side view of the aberration correction element of the nineteenth exemplary embodiment.

In FIG. 20, the components common to those of FIG. 3 of the first exemplary embodiment are denoted using the same reference numerals, and the descriptions thereof are omitted.

An aberration correction element 67 of the present exemplary embodiment includes the substrate 221 and the plurality of columnar structures 222. The aberration correction element 67 includes a third region 67c provided with the plurality of columnar structures 222 in an irradiation region of the incident light at a first density, and a fourth region 67d provided with the plurality of columnar structures 222 in an irradiation region of the incident light at a second density different from the first density. That is, the aberration correction element 67 includes the third region 67c provided with the plurality of columnar structures 222 at a high density, and the fourth region 67d provided with the plurality of columnar structures 222 at a low density.

In the present exemplary embodiment, in a center portion of the aberration correction element 67 near the optical axis AX, the plurality of columnar structures 222 are provided at high density. In a peripheral portion of the aberration correction element 67 away from the optical axis AX, the plurality of columnar structures 222 are provided at low density. However, the columnar structures 222 need not necessarily have a high density in the center portion of the aberration correction element 67 and a low density at the peripheral portion of the aberration correction element 67, and the positions of the third region 67c and the fourth region 67d can be set as appropriate.

The pitch of the columnar structures 222 is a parameter that determines resonance frequency, and is also a parameter that determines a spatial sampling interval of phase distribution. For example, when condensing is performed using a lens, the equiphase surface F is obtained where the phase changes continuously, as illustrated in FIG. 8. On the other hand, in the case of an aberration correction element including columnar structures, because the amount of phase modulation is determined by the diameter of the columnar structure, a discrete phase distribution G corresponding to the positions where the columnar structures 222 are present is obtained, as illustrated in FIG. 20. Therefore, in the region where the pitch of the columnar structure 222 is narrow, the sampling interval of the phase is narrower than that of the region where the pitch of the columnar structure 222 is wider, and a function close to an ideal phase distribution is obtained. However, when the pitch of the columnar structure 222 is changed, the resonance frequency changes and, as a result, the shape of the columnar structure 222 needs to be adjusted using another parameter, such as a height of the columnar structure 222, for example.

For example, in the case where the aberration correction element 67 is used as a light condensing element, when the light amount distribution of incident light is concentrating in the vicinity of optical axis, the pitch of the columnar structure 222 in the center portion of the aberration correction element 67 is made narrower, as in the present exemplary embodiment. Thus, deviation from the desired phase distribution at the center portion of the aberration correction element 67 can be minimized, and light condensing efficiency can be improved. In this case, the peripheral portion of the aberration correction element 67 has minimal amount of incident light, and therefore the effect of deviation from the desired phase distribution is less than that of the element center portion, and the improvement in light condensing efficiency is not greatly impeded. Also, by increasing the pitch of the columnar structure 222 in the peripheral portion, it is possible to reduce the level of difficulty when the aberration correction element 67 is fabricated. As a result, the aberration correction element 67 can result in an improvement in yield when mass-producing the aberration correction element 67.

The aberration correction element 67 of the present exemplary embodiment can be applied to any one of the optical devices of the first to eighteenth exemplary embodiments.

Note that the technical scope of the present disclosure is not limited to the above-described exemplary embodiments, and various modifications can be made to the above-described exemplary embodiments without departing from the spirit and gist of the present disclosure.

For example, while a case in which the columnar structure has a cylindrical shape, a rectangular parallelepiped shape, or the like is illustrated in the exemplary embodiments described above, the columnar structure may have a tapered shape with a surface area of a bottom surface greater than a surface area of a top surface. According to this configuration, even when the columnar structure is formed at a curved surface of the lens, for example, the parallelism between the side surfaces of adjacent columnar structures can be maintained. For example, an inclination angle of the tapered surface may be about 15° or less with respect to the normal direction. Furthermore, examples of means for forming a nano-order columnar structure include a nanoimprint method. When the columnar structure is formed using the nanoimprint method and the columnar structure has a tapered shape, a peeling task when the transfer mold is peeled from the columnar structure material can be easily performed, and a columnar structure having a desired shape is easily obtained.

Further, the specific configuration of each component constituting the optical device, such as the shape, quantity, arrangement, or material of the components is not limited to that of exemplary embodiments described above, and may be appropriately changed.

Further, the optical device of the above-described embodiments is not limited to the optical system of the projector illustrated in FIG. 1, and can also be applied to a scanner device, a sensing infrared wavelength projection optical device for an interactive projector, and the like. Furthermore, the optical device is not limited to a projector, and can also be applied to a display device such as a head-mounted display.

What is claimed is:

1. An optical device comprising:
   an optical element; and
   an aberration correction element configured to correct aberration caused by the optical element, wherein
   the aberration correction element includes a plurality of columnar structures made of a dielectric material,
   the plurality of columnar structures have a refractive index and a pitch such that a waveguide effect with respect to incident light is produced, a diameter of a first columnar structure and a diameter of a second columnar structure among the plurality of columnar structures differ from each other, the pitch is not shorter than a wavelength of the incident light within each of the plurality of columnar structures and shorter than a wavelength in air, and the plurality of columnar structures are configured to produce waveguide mode resonance with respect to the incident light.

2. The optical device according to claim 1, wherein the pitch satisfies a phase matching condition of $k=m \cdot 2\pi/U$, wherein k is a wavenumber, U is a pitch, and m is an integer.

3. The optical device according to claim 1, wherein the aberration correction element includes
a base material and
the plurality of columnar structures provided on the base material.

4. The optical device according to claim 3, wherein the base material includes a light-transmitting substrate including a first surface and a second surface and light emitted from the optical element is incident on the first surface of the light-transmitting substrate and emitted from the second surface of the light-transmitting substrate.

5. The optical device according to claim 3, wherein the base material includes
a foundation layer including a first surface and a second surface and
a reflection layer provided to the second surface of the foundation layer and
the light emitted from the optical element is incident on the first surface of the foundation layer, reflected by the reflection layer, and emitted from the first surface of the foundation layer.

6. The optical device according to claim 5, wherein a difference between a refractive index of each of the plurality of columnar structures and a refractive index of the foundation layer is not lower than 0.1.

7. The optical device according to claim 1, wherein the plurality of columnar structures are provided on the optical element.

8. The optical device according to claim 1, wherein the aberration correction element further includes a low refractive index layer that is provided around each of the plurality of columnar structures and that has a refractive index lower than a refractive index of each of the plurality of columnar structures.

9. The optical device according to claim 8, wherein a difference between the refractive index of each of the plurality of columnar structures and the refractive index of the low refractive index layer is not lower than 0.1.

10. The optical device according to claim 1, wherein the aberration correction element includes
a first region provided with at least one of the plurality of columnar structures in an irradiation region of the incident light and
a second region not provided with the plurality of columnar structures in an irradiation region of the incident light.

11. The optical device according to claim 1, wherein the aberration correction element includes
a region provided with the plurality of columnar structures, at a first density, in an irradiation region of the incident light and a another region provided with the plurality of columnar structures, at a second density different from the first density, in an irradiation region of the incident light.

12. A display device comprising the optical device according to claim 1.

13. An optical device comprising:
an optical element; and
an aberration correction element configured to correct aberration caused by the optical element, wherein
the aberration correction element includes a plurality of columnar structures made of a dielectric material,
the plurality of columnar structures have a refractive index and a pitch such that a waveguide effect with respect to incident light is produced,
a diameter of a first columnar structure and a diameter of a second columnar structure among the plurality of columnar structures differ from each other,
the aberration correction element includes
a base material; and
the plurality of columnar structures provided on the base material,
the base material includes
a foundation layer including a first surface and a second surface; and
a reflection layer provided to the second surface of the foundation layer, and
the light emitted from the optical element is incident on the first surface of the foundation layer, reflected by the reflection layer, and emitted from the first surface of the foundation layer.

14. The optical device according to claim 13, wherein a difference between a refractive index of each of the plurality of columnar structures and a refractive index of the foundation layer is not lower than 0.1.

15. An optical device comprising:
an optical element; and
an aberration correction element configured to correct aberration caused by the optical element, wherein
the aberration correction element includes a plurality of columnar structures made of a dielectric material,
the plurality of columnar structures have a refractive index and a pitch such that a waveguide effect with respect to incident light is produced,
a diameter of a first columnar structure and a diameter of a second columnar structure among the plurality of columnar structures differ from each other, and
the aberration correction element further includes a low refractive index layer that is provided around each of the plurality of columnar structures and that has a refractive index lower than a refractive index of each of the plurality of columnar structures.

16. The optical device according to claim 15, wherein a difference between the refractive index of each of the plurality of columnar structures and the refractive index of the low refractive index layer is not lower than 0.1.

17. An optical device comprising:
an optical element; and
an aberration correction element configured to correct aberration caused by the optical element, wherein
the aberration correction element includes a plurality of columnar structures made of a dielectric material,
the plurality of columnar structures have a refractive index and a pitch such that a waveguide effect with respect to incident light is produced,
a diameter of a first columnar structure and a diameter of a second columnar structure among the plurality of columnar structures differ from each other, and the aberration correction element includes
  a first region provided with at least one of the plurality of columnar structures in an irradiation region of the incident light; and
  a second region not provided with the plurality of columnar structures in an irradiation region of the incident light.

18. An optical device comprising:

an optical element; and an aberration correction element configured to correct aberration caused by the optical element, wherein the aberration correction element includes a plurality of columnar structures made of a dielectric material, the plurality of columnar structures have a refractive index and a pitch such that a waveguide effect with respect to incident light is produced, a diameter of a first columnar structure and a diameter of a second columnar structure among the plurality of columnar structures differ from each other, the aberration correction element includes
  a region provided with the plurality of columnar structures, at a first density, in an irradiation region of the incident light; and
  another region provided with the plurality of columnar structures, at a second density different from the first density, in an irradiation region of the incident light.

* * * * *